(12) United States Patent
Bergamini

(10) Patent No.: US 10,954,806 B2
(45) Date of Patent: Mar. 23, 2021

(54) SEAL FOR A GAP BETWEEN AN OUTER AND AN INNER CYLINDRICAL SURFACE

(71) Applicant: Nuovo Pignone Srl, Florence (IT)

(72) Inventor: Lorenzo Bergamini, Florence (IT)

(73) Assignee: NUOVO PIGNONE SRL, Florence (IT)

(*) Notice: Subject to any disclaimer, the term of this patent is extended or adjusted under 35 U.S.C. 154(b) by 388 days.

(21) Appl. No.: 15/518,121

(22) PCT Filed: Oct. 2, 2015

(86) PCT No.: PCT/EP2015/072803
§ 371 (c)(1),
(2) Date: Apr. 10, 2017

(87) PCT Pub. No.: WO2016/055371
PCT Pub. Date: Apr. 14, 2016

(65) Prior Publication Data
US 2017/0306778 A1    Oct. 26, 2017

(30) Foreign Application Priority Data
Oct. 10, 2014  (IT) .............................. MI2014A1778

(51) Int. Cl.
*F16J 15/3292*   (2016.01)
*F01D 11/00*    (2006.01)

(52) U.S. Cl.
CPC .......... *F01D 11/003* (2013.01); *F01D 11/001* (2013.01); *F16J 15/3292* (2013.01)

(58) Field of Classification Search
CPC .... F01D 11/003; F01D 11/001; F01D 11/006; F01D 11/00; F16J 15/3292; F16J 15/3268

USPC .......................................................... 277/355
See application file for complete search history.

(56) References Cited

U.S. PATENT DOCUMENTS

| 7,651,101 | B2* | 1/2010 | Awtar | F01D 11/003 |
| | | | | 277/355 |
| 8,162,323 | B2* | 4/2012 | Nicholson | F16J 15/3292 |
| | | | | 277/355 |
| 8,162,324 | B2* | 4/2012 | Deo | F01D 11/003 |
| | | | | 277/413 |

(Continued)

FOREIGN PATENT DOCUMENTS

| EP | 0 391 676 A1 | 10/1990 |
| EP | 0 933 567 A2 | 8/1999 |
| EP | 1 878 955 A1 | 1/2008 |

OTHER PUBLICATIONS

First Office Action and Search issued in connection with corresponding CN Application No. 201580055000.4 dated Mar. 19, 2018.

(Continued)

*Primary Examiner* — Nathan Cumar
(74) *Attorney, Agent, or Firm* — Baker Hughes Patent Organization

(57) ABSTRACT

A seal for a gap between an outer and an inner cylindrical surface, coaxial with a central axis in common and arranged to rotate reciprocally, the seal comprises a plurality of plate elements stacked onto one another to define a ring between the outer and inner cylindrical surfaces, wherein each plate has a concave and a convex side, the convex side of each plate element being adjacent to the concave side of the next plate element.

10 Claims, 4 Drawing Sheets

(56) References Cited

U.S. PATENT DOCUMENTS

| | | | | |
|---|---|---|---|---|
| 2003/0131602 A1* | 7/2003 | Ingistov | ................ | F01D 11/001 60/772 |
| 2008/0048399 A1* | 2/2008 | Nicholson | ............. | F01D 11/001 277/355 |
| 2008/0061513 A1* | 3/2008 | Awtar | ................... | F01D 11/001 277/355 |
| 2012/0315138 A1* | 12/2012 | Rao | ........................ | F01D 11/00 415/231 |
| 2013/0181412 A1* | 7/2013 | Shinohara | ................ | F16J 15/16 277/500 |

OTHER PUBLICATIONS

Search Report issued in connection with corresponding IT Application No. MI2014A001778 dated May 29, 2015.
International Search Report and Written Opinion issued in connection with corresponding PCT Application No. PCT/EP2015/072803 dated Jan. 19, 2016.
International Preliminary Report on Patentability issued in connection with corresponding PCT Application No. PCT/EP2015/072803 dated Apr. 11, 2017.

\* cited by examiner

US 10,954,806 B2

SEAL FOR A GAP BETWEEN AN OUTER AND AN INNER CYLINDRICAL SURFACE

BACKGROUND

The present disclosure relates to a seal for a gap between an outer and an inner cylindrical surface. The surfaces have a central axis, are coaxial and are arranged to rotate reciprocally. Specifically, the disclosure relates to an internal seal for a turbomachine, for example a seal between a rotating shaft and an external case holding a working fluid. In the following disclosure centrifugal pumps will be referred as a specific application of the disclosure; no loss of generality is however intended.

In the state of the art, a seal for the above mentioned gap can be provided by closely packing a plurality of flat plates. These plates are arranged radially. In other words, the plates are arranged so that they lay on a plane containing the central axis of the surfaces. The length, the thickness and the number of plates are selected so that only small gaps are present between two neighboring plates. These gaps allow a small leakage of working fluid. The leakage is deemed acceptable, because it contributes to the lubrication of the reciprocally moving surfaces.

Disadvantageously, if the cylindrical surfaces have small radii compared to their reciprocal distances, relatively large gaps can result between plates near the external cylindrical surface. These large gaps (about 0.1-0.3 mm) will tend to cause excessive leaks of fluid. Also, may be subject to problems (loss of flexibility and consequent rubbing) if contaminated by entrapped solid particles.

SUMMARY

A first aspect of the disclosure is therefore directed to a seal for a gap between an outer and an inner cylindrical surface. The surfaces have a central axis, are coaxial and are arranged to rotate reciprocally. The seal itself comprises a plurality of plate elements stacked onto one another in order to define a ring between the outer and the inner cylindrical surface. Each plate has a concave and a convex side. The convex side is adjacent to the concave side of the next plate.

In an embodiment, the gaps between the plates are greatly reduced, even for small radii and large distances between the outer and the inner surfaces and consequently the leaks of fluid.

Another aspect of the disclosure relates to the above described seal, in which each seal also comprising an elastic element placed externally on said ring defined by said plurality of plate elements.

In an embodiment, this elastic element provides a preload that keeps the seal elements always in contact with the rotating surface during the startup phase and maintains them stacked to each other.

Another aspect of the disclosure relates to a turbomachine comprising at least one seal according to this disclosure.

BRIEF DESCRIPTION OF THE DRAWINGS

Further details and specific embodiments will refer to the attached drawings, in which.

DETAILED DESCRIPTION

Figure 1:
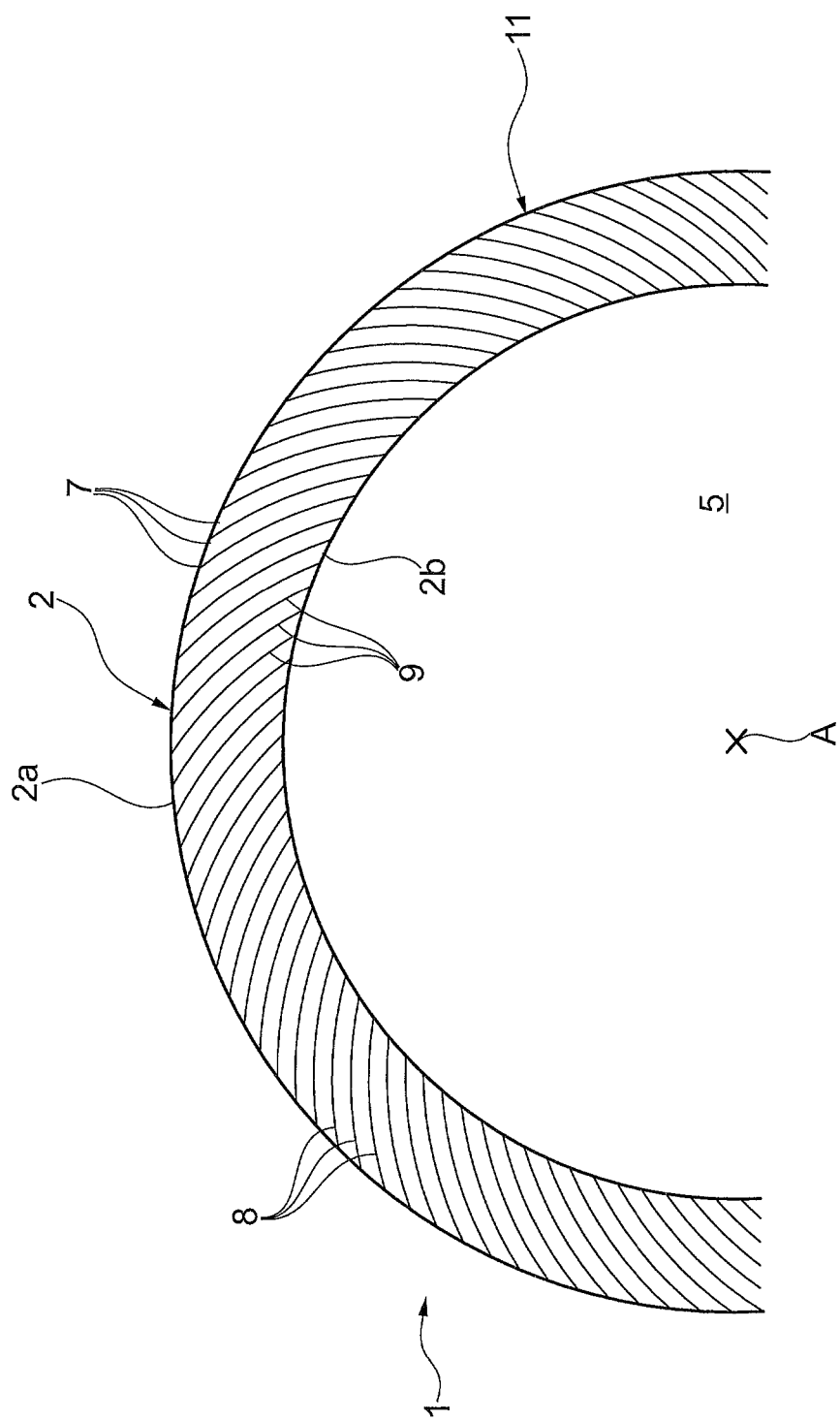
FIG. 1 is a frontal sectional view of a seal for a gap according to an embodiment of the present disclosure.

The following description of exemplary embodiments refers to the accompanying drawings. The same reference numbers in different drawings identify the same or similar elements. The following detailed description does not limit the disclosure. Instead, the scope of the disclosure is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Therefore, a seal for a gap between an outer and an inner cylindrical surface will be described by referring to the attached figures, in which will be indicated with the number 1.

The gap 2 is itself defined between an outer 2a and an inner cylindrical surface 2b. These surfaces 2a, 2b are arranged so that they have a central axis "A" in common. In other words, the surfaces 2a, 2b are coaxial. The surfaces 2a, 2b are also arranged so that they rotate with respect to each other around the central axis "A". Specifically, it is not necessary that both surfaces 2a, 2b rotate. Indeed, in an embodiment the inner cylindrical surface 2b can be the surface of a shaft 5. The outer cylindrical surface 2a can be the surface of a casing 6 of the turbomachine.

The surfaces are arranged so that the seal 1 separates an internal environment 3 from an external environment 4. For example, the internal environment 3 can be the inside of a turbomachine (not shown) to which the seal 1 is applied. In the internal environment can be present a working fluid at an internal pressure "P1". The external environment 4 can be either the atmosphere or another environment inside the turbomachine. In either case, in the external environment 4 an external pressure "P2" is defined.

With more detail, the seal 1 comprises a plurality of plate elements 7. These plate elements 7 are stacked onto one another, so as to define ring 11 between the outer 2a and the inner cylindrical surfaces 2b.

Figure 2:
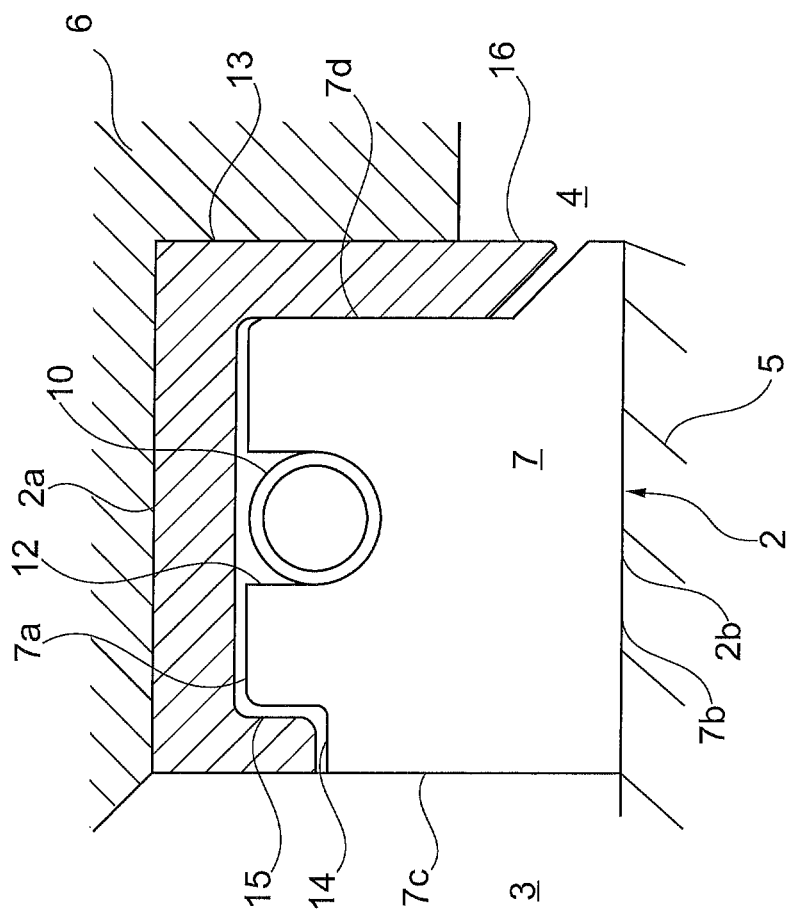
FIG. 2 is a side sectional view of a detail of the seal of FIG. 1.

With particular reference to FIG. 2, the seal 1 comprises a seal holder 13, in which the plate elements 7 are inserted. Specifically, the seal holder 13 has a recess 14 placed in contact with the outer cylindrical surface 2a. The recess 14 is bounded by an inner wall 14, which faces the internal environment, and by an outer wall 16, which faces the external environment. In particular, the inner 15 and the outer wall 16 extend from the outer cylindrical surface 2a toward the inner cylindrical surface 2b. However, the walls 15, 16 of the seal holder 13 do not contact the inner cylindrical surface 2b of the gap 2. During normal operation, the pressure difference and the centripetal forces acting on plates 7 push the plates 7 against the inner wall 16 of the seal holder 13.

With additional detail, each plate element 7 has a constant thickness and is substantially flat along a direction parallel to the central axis "A". The thickness is, in an embodiment, comprised between 2% and 10% of the diameter of the seal 1. In further embodiments, the thickness is comprised between 2% and 5% of the diameter of the seal 1. Each plate element is therefore curve along a direction transversal to the central axis "A", in particular tangent to the cylindrical surface.

Specifically, each plate has a concave 8 and a convex side 9. The convex side 9 of each plate 7 is adjacent to the concave side 8 of the next plate element 7. The convex side 9 and the concave side 8 of each plate element 7 are complementary. By the term "complementary" it is understood that the curvature of each side 8, 9 of the plate element 7 is the same.

In other words, each plate element 7 has profile in a plane substantially perpendicular to the central axis "A". The profile has a predetermined curvature.

Figure 3:
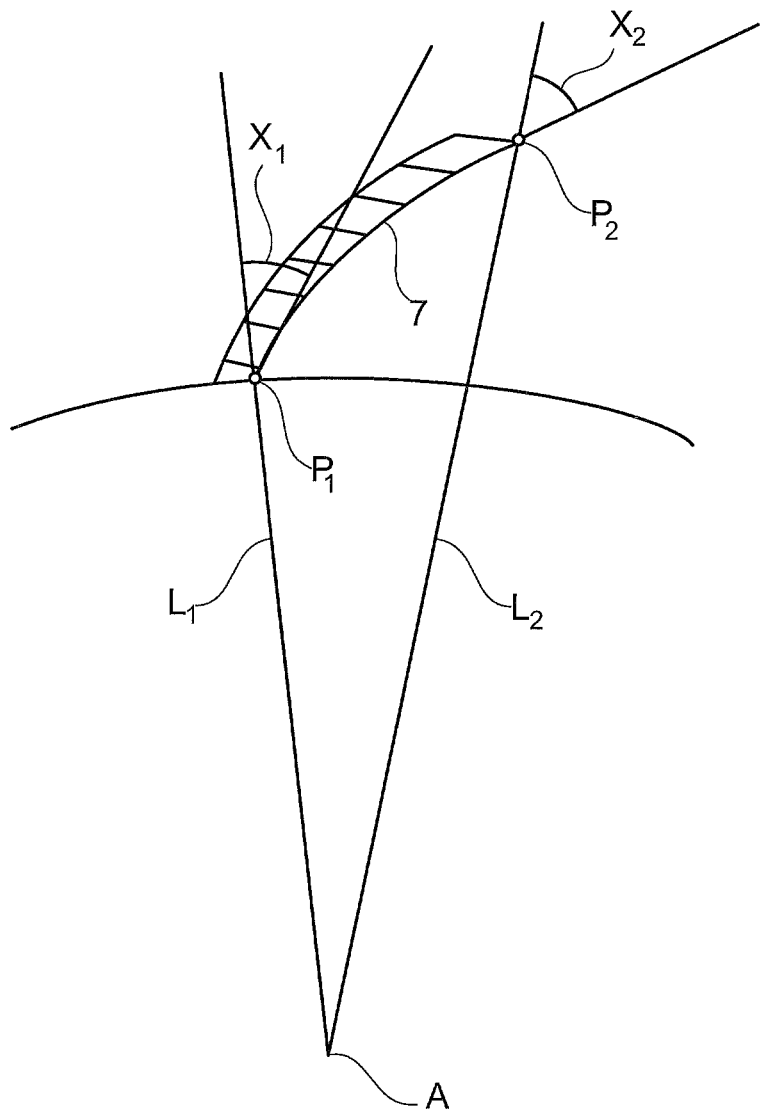
FIG. 3 is a frontal sectional view of a detail of the seal of FIGS. 1 and 2.

In a first embodiment, the profile has a curvature such that ratio between the cosines of the angles (between the plate element surface and the radial direction) at two any points of concave 8 or convex side 9 is equal to the inverse ratio between the respective distances from the axis of rotation. In other words, as shown in FIG. 3, at each point P1, P2 of the profile is defined an angle X1, X2 between the surface of the plate element 7 and a radial direction. At each point P1, P2 is also defined a distance L1, L2 from the central axis "A" along the above mentioned radial direction. In the first embodiment, the curvature of the plate element 7 is such that a value of the product between the cosine of the angle X1, X2 and the distance L1, L2 is constant for each point P1, P2 of the profile of the plate element 7.

In a second embodiment, the profile has a constant curvature that approximates the law defined in the first embodiment.

With additional detail, each plate element 7 has an outer edge 7a, an inner edge 7b, and a front 7c and rear edges 7d. The outer edge 7a faces the outer cylindrical surface 2a. The inner edge 7b faces the inner cylindrical surface 2b. The front edge 7c faces the internal environment 3. The rear edge faces the external environment 4.

In an Embodiment, the inner 7b and outer edges 7a are parallel. Similarly, the front 7c and back edges 7d are also parallel.

The seal 1 also comprises an elastic element 10 placed between the outer cylindrical surface 2a and the plate element 7. Substantially, the elastic element 10 is positioned on the external side of the ring defined by said plate elements 7. In an embodiment, the elastic element 10 is placed between the outer edge 7a of the plate element 7 and the outer cylindrical surface 2b. In further embodiments, the elastic element 10 is continuous.

As shown in FIG. 2, the elastic element 10 is a spring, for example an helical spring. With more detail, the plate element 7 has a seat 12 in order to receive the elastic element 10. Specifically, the seat 12 is defined in the outer edge 7a of the plate element 7.

With additional detail, the elastic element 10 is placed in the seat 12 of all plate elements 7. In other words, a single spring contacts all of the plate elements 7 of the seal 1. In an alternative embodiment, the seat 12 is completely enclosed in the plate 7.

A further aspect of the disclsoure is a turbomachine comprising at least one seal according to this invention.

A seal as described above can be installed in one or more zones of a centrifugal compressor 100, in place of a generic labyrinth seal.

Figure 4:
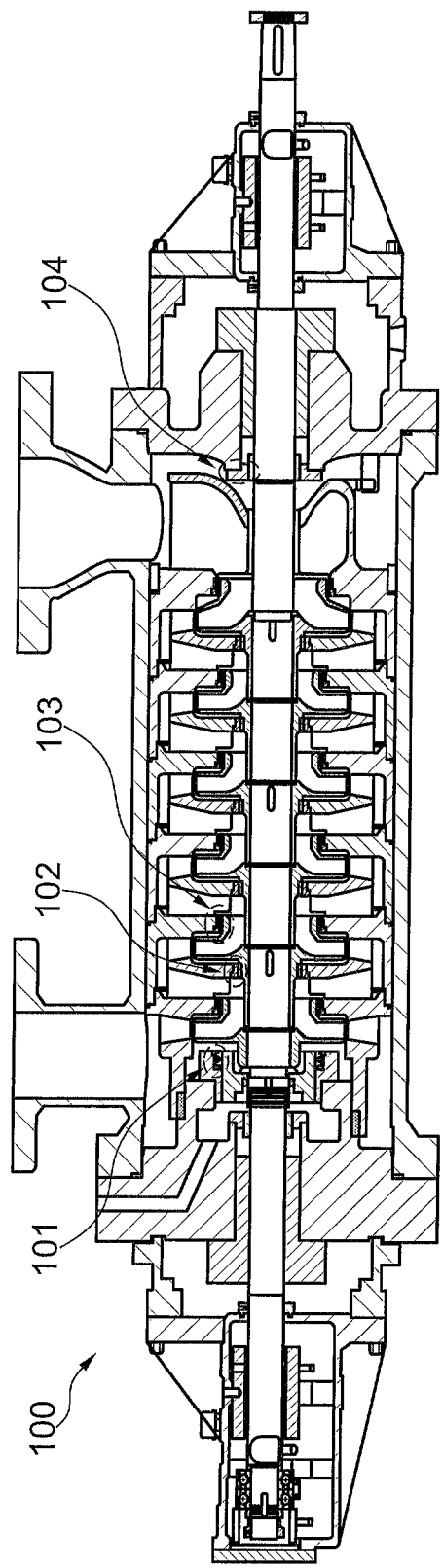
FIG. 4 is frontal sectional view of a centrifugal compressor comprising a plurality of seals according to the present disclosure.

As shown in FIG. 4, the seal can be installed on a balance drum 101, and/or on a balance bushing 104, and/or on an impeller 102,103, in particular on an impeller eye 103. This kind of seal can be installed both on statoric or rotoric part of the turbomachine.

What is claimed is:

1. A seal for a gap between an outer cylindrical surface and an inner cylindrical surface, said surfaces being relative to a central axis, said seal comprising:
   an elastic element:
   a plurality of plate elements stacked onto one another to define a ring between said outer and inner cylindrical surfaces, wherein each plate element of the plurality of plate elements has a recess defining a seat configured to receive a portion of the elastic element, and each plate element has a concave and a convex side, the convex side of each plate element being adjacent to the concave side of an adjacent plate element: and
   a seal holder extending over the seat of each plate element of the plurality of plate elements and into which the plurality of plate elements are inserted, the seal holder defining a recess bounded by an interior wall and an exterior wall, wherein the interior wall and the exterior wall extend from the outer cylindrical surface of the gap toward the inner cylindrical surface of the gap but do not contact the inner cylindrical surface of the gap.

2. A seal according to claim 1, wherein the convex side and the concave side of each plate element are complementary.

3. A seal according to the claim 1, wherein each plate element has a constant thickness.

4. A seal according to claim 1, wherein each plate element has a profile having a predetermined curvature in a plane substantially perpendicular to said central axis, said profile.

5. A seal according to claim 4, wherein said profile has a constant curvature.

6. A seal according to claim 4, wherein at each point of the profile is defined an angle between the surface of the plate element and a radial direction, a distance from the central axis along said radial direction; the curvature of said plate element being such that a value of the product between the cosine of said angle and said distance is essentially constant for each point of the profile of the plate element.

7. A seal according to claim 1, wherein said elastic element is continuous.

8. A seal according to claim 1, wherein the plurality of plate elements are disposed between a stationary component and a rotary component of a turbo machine.

9. A seal according to claim 1, wherein the elastic element comprises a helical spring.

10. A seal according to claim 1, wherein the seal holder and each plate element of the plurality of plate elements define parallel surfaces that are angled relative to the outer cylindrical surface and the inner cylindrical surface.

\* \* \* \* \*